(12) United States Patent
Reuber

(10) Patent No.: US 10,543,623 B2
(45) Date of Patent: Jan. 28, 2020

(54) INJECTOR FOR FILLING A MOLD WITH PLASTIC PARTICLES

(71) Applicant: Kurtz GmbH, Kreuzwertheim (DE)

(72) Inventor: Norbert Reuber, Bergrothenfels (DE)

(73) Assignee: Kurtz GmbH, Kreuzwertheim (DE)

( * ) Notice: Subject to any disclaimer, the term of this patent is extended or adjusted under 35 U.S.C. 154(b) by 537 days.

(21) Appl. No.: 15/103,891

(22) PCT Filed: Dec. 19, 2014

(86) PCT No.: PCT/EP2014/078645
§ 371 (c)(1),
(2) Date: Jun. 13, 2016

(87) PCT Pub. No.: WO2015/091906
PCT Pub. Date: Jun. 25, 2015

(65) Prior Publication Data
US 2016/0332337 A1    Nov. 17, 2016

(30) Foreign Application Priority Data

Dec. 19, 2013    (DE) .......................... 10 2013 114 570

(51) Int. Cl.
*B29C 31/04*    (2006.01)
*B29C 44/44*    (2006.01)
(Continued)

(52) U.S. Cl.
CPC ........ *B29C 31/041* (2013.01); *B29C 44/3442* (2013.01); *B29C 65/10* (2013.01);
(Continued)

(58) Field of Classification Search
CPC ... B29C 31/04; B29C 31/041; B29C 44/3426; B29C 44/3442; B29C 44/3461;
(Continued)

(56) References Cited

U.S. PATENT DOCUMENTS

| 3,139,466 | A | * | 6/1964 | Couchman | ............ B29C 44/445 264/121 |
| 3,424,827 | A | * | 1/1969 | Galizia | ................. B29C 44/445 264/51 |
| 2015/0166270 | A1 | | 6/2015 | Buscher et al. | |

FOREIGN PATENT DOCUMENTS

| DE | 7928606 U1 | 1/1980 |
| DE | 3831600 C1 | 8/1989 |

(Continued)

OTHER PUBLICATIONS

International Preliminary Report on Patentability, dated Jun. 30, 2016, from International Application No. PCT/EP2014/078645, filed on Dec. 19, 2014. English and German. Fifteen pages.

(Continued)

*Primary Examiner* — Michael A Tolin
(74) *Attorney, Agent, or Firm* — HoustonHogle LLP

(57) ABSTRACT

The invention relates to an injector for filling a mold with plastic particles, with a front part (2) and a base part (3), wherein the front part (2) has a mold-side orifice (23) and a feed for compressed air (15) and a feed for plastic particles (11), and the base part (3) is attached axially in the direction of conveyance behind the front part (2) and has a piston-cylinder unit (30, 37, 38), wherein a closing piston (49) for closing the mold-side orifice (23) is axially movable through the front part (2), together with an apparatus and a method for the production of a particle form part. The injector is characterised in that the closing piston (49) and the piston rod (47) bearing the closing piston on its front side have equal diameters or substantially equal diameters and the method comprises the following steps:

Figure 4:
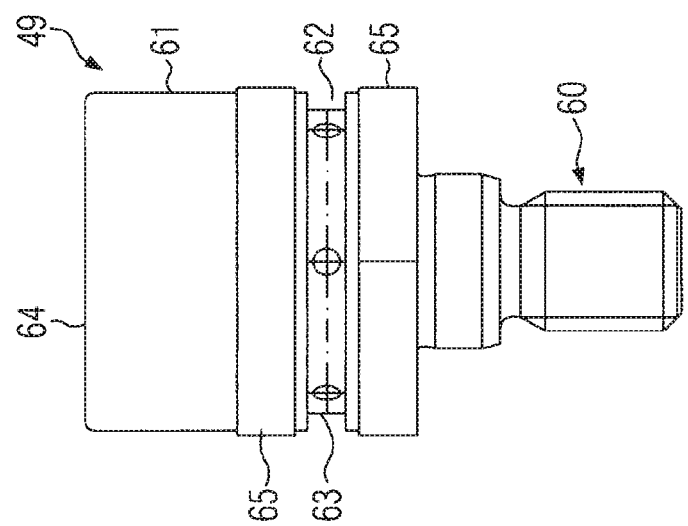

feeding form particles from a material container to a mold by means of a pipe (Continued)

thermoplastic welding of the form particles in the mold into a particle form part under a supply of heat, wherein steam is added to the form particles to be fed.

6 Claims, 5 Drawing Sheets

(51) Int. Cl.
  *B29C 44/34* (2006.01)
  *B29C 65/10* (2006.01)
  *B29C 65/00* (2006.01)
  *B29K 105/04* (2006.01)
  *B29K 75/00* (2006.01)
  *B29K 101/12* (2006.01)

(52) U.S. Cl.
  CPC ........ *B29C 66/727* (2013.01); *B29K 2075/00* (2013.01); *B29K 2101/12* (2013.01); *B29K 2105/048* (2013.01)

(58) Field of Classification Search
  CPC ....... B29C 44/42; B29C 44/44; B29C 44/445; B29K 105/04; B29K 2075/00; B29K 2101/12; B29K 2105/04; B29K 2105/048; B65G 53/16; B65G 53/526; C08J 9/232
  See application file for complete search history.

(56) References Cited

FOREIGN PATENT DOCUMENTS

| | | | |
|---|---|---|---|
| DE | 19747645 A1 | | 5/1999 |
| DE | 29919328 U1 | | 1/2000 |
| DE | 102008016883 A1 | | 7/2009 |
| DE | 102009024278 A1 | | 12/2010 |
| EP | 1 813 408 A1 | | 8/2007 |
| JP | H0568633 U | | 9/1993 |
| JP | 08174551 A | * | 7/1996 |
| JP | H08174551 A | | 7/1996 |
| WO | 2010010010 A1 | | 1/2010 |
| WO | 2013182555 A1 | | 12/2013 |

OTHER PUBLICATIONS

English translation of International Search Report, dated Mar. 23, 2015, for International Application No. PCT/EP2014/078645, filed on Dec. 19, 2014. Two pages.

\* cited by examiner

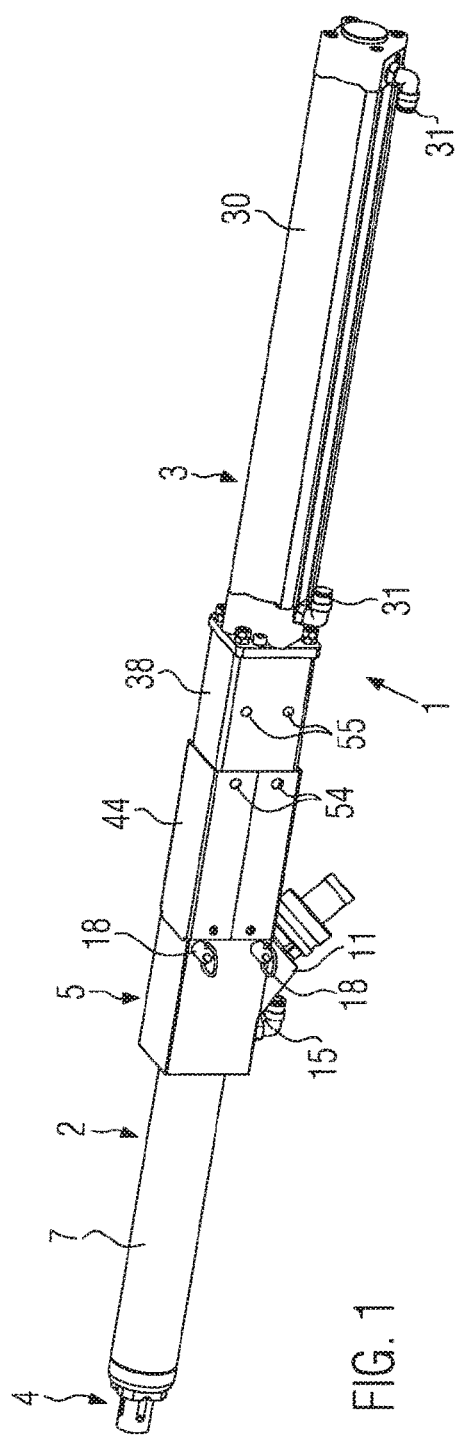
FIG. 1
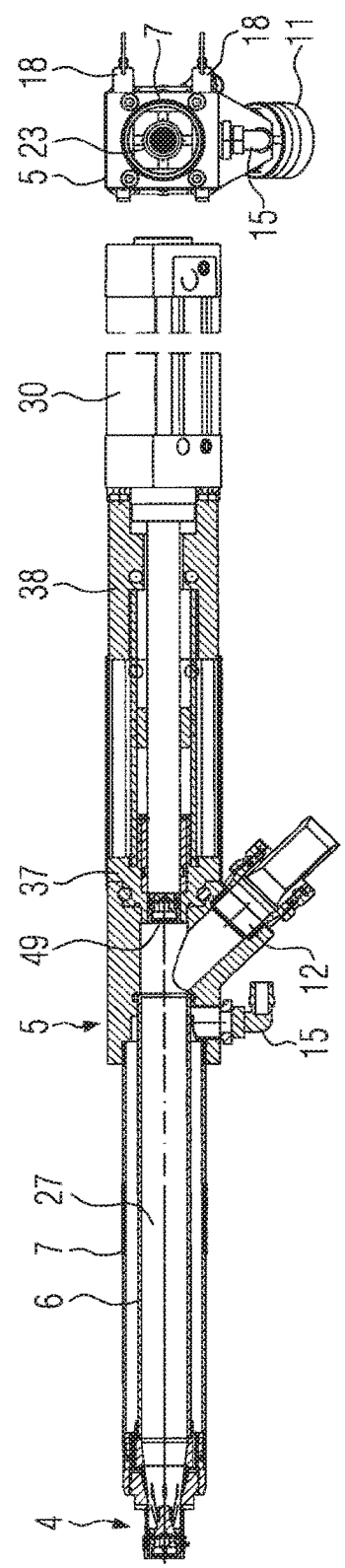
FIG. 2
FIG. 3

INJECTOR FOR FILLING A MOLD WITH PLASTIC PARTICLES

RELATED APPLICATIONS

This application is a § 371 National Phase Application of international Application No. PCT/EP2014/078645, filed on Dec. 19, 2014, which claims priority to German Application No, 10 2013 114 570.1, filed on Dec. 19, 2013, both of which are incorporated herein by reference in their entirety.

The present invention relates to an injector for filling a mold with plastic particles, an apparatus for producing a particle form part, and a method for producing a particle form part.

Known from DE 38 31 600 C1 are a method and an apparatus for the feeding of thermoplastic form particles into the mold cavity of a mold, wherein it should especially be possible as required to fill a vented mold with thermoplastic form particles from a supply tank, namely thermoplastic form particles containing blowing agent, both under atmospheric pressure and also with overpressure, and also to fill with overpressure a mold under the same high pressure, with compressible form particles which cannot be blown, thereby saving compressed air and reducing filling time. This is achieved by providing that, after completion of the filling process, form particles remaining in the filling injectors and in the feed lines are blown back into another container which is not under pressure and is independent of the supply tank. Used for feeding the form particles into the mold cavity is a filling injector with a closing piston which may be used either to close or open the feed orifice to the mold cavity. Via a 2/2-way valve, compressed air from a compressed air source is pressed through injector nozzles fitted inside the filling injector, by which means form particles are sucked in through feed lines into a distributor casing and a closing organ from the discharge orifice of a supply tank and pressed through the feed orifice into the mold cavity when the closing piston is retracted. The latter is actuated using compressed air through a 3/2-way valve.

Known similarly from DE 197 47 645 A1 is a method for producing a form body and the form body, which also involves the processing of particle forms, and the filling of the mold cavity with form particles of a prescribed grain size. The filling is effected through one or more fillers which are in the form of injectors and are supplied with compressed air. The form particles are sucked in from a supply tank, not shown, and blown into the mold cavity by the compressed air. To obtain good filling, the mold cavity is vented during this process.

The use of filling injectors is also known from DE 10 2008 016 883 A1. DE 299 19 328 U1 relates to a filling injector for rigid form automatic molding machines and DE 79 28 606 U1 also concerns a filling injector, in particular for the conveying of pre-formed, small pieces of styrene polymer which is still capable of being blown. In the case of these two filling injectors, a piston rod has a smaller diameter than the piston.

WO 2013/182555 A1 relates to a method for the transport of formed thermoplastic polymer particles from a container through one or more pipelines, wherein, to transport the formed thermoplastic polymer particles, a gas flow is applied through the pipeline, and the formed thermoplastic polymer particles are wetted with a lubricant containing water. The lubricant should contain water and the necessary pressure is generated by air or nitrogen.

The form particles used for such processes, in particular form particles of ETPU, have a relatively high mutual adhesive force so that the form particles are able to stick together, which may impair in particular metering, conveying and filling.

Injectors for the filling of molds with form particles, and in particular the ETPU particles referred to, consist of a front part and a base part arranged behind the former in the direction of conveyance. The front part is formed substantially by two concentric cylinders, wherein an inner cylinder forms an orifice in the area of one free end, which opens out into a mold and at an opposite end has a separately attached filler neck, which is connected to a store for plastic particles. The second concentric outer cylindrical pipe serves to supply compressed air, which enters the inner cylindrical pipe in the area of the orifice and forms a nozzle operating according to the Venturi principle, wherein the compressed air flows into a mold and at the same time the plastic particles are sucked out of the plastic particle store through the filler neck and the inner cylindrical pipe.

The base part includes a pneumatic drive, in front of which there is provided a guide section in which is mounted a piston which may be driven by the pneumatic unit, while the piston is mounted at the front in a piston guide and there is a piston rod with a diameter less than that of the piston. The piston rod is mounted by a guide device in the guide section, wherein by actuation of the pneumatic drive, the piston rod may be extended out of the guide section with the piston ahead of it. Front part and base part are firmly connected to one another by screw connections, while the piston may be guided, through actuation of the pneumatic drive, through the inner cylindrical pipe to the orifice, so that the latter may be closed on the injector side and any backflow of steam prevented, when the plastic particles are processed in the mold and where applicable the mold is closed.

Disclosed in DE 10 2009 024 278 A1 is a filling apparatus for filling a mold with plastic particles of thermoplastic material. Here there is provided an actuating piston, which is connected to and able to move a closing piston. In this case the actuating piston has a contoured casing wall, in which are formed air guides extending in the axial direction. In an open position, the closing piston is retracted into an air passage. The closing piston is so dimensioned that between the closing piston and the air passage there is formed an annular passage which acts as outlet nozzle. Air guided through this outlet nozzle flows into an outlet passage.

The problem of the invention is to create an injector which is more robust and easier to maintain, and at the same time flexible.

The problem is solved by an injector with the features of originally filed claim 1.

Advantageous developments are set out in the relevant dependent claims.

A further problem is to create an apparatus for the production of a particle form part, with which a mold may be reliably and completely filled with form particles, even if the form particles have high mutual adhesive forces, as is the case for example with form particles based on polyurethane.

This problem is solved by an apparatus with the features of originally filed claim 6.

It is also a problem of the method to produce a particle form part, with which a mold may be reliably and completely filled with form particles, even if the form particles have high mutual adhesive forces, as is the case for example with form particles based on polyurethane.

The problem is solved by a method with the features of originally filed claim 7.

Advantageous developments are set out in the relevant dependent claims.

According to the invention it was known that due to a piston rod with a diameter less than that of the closing piston for the orifice, conveyed plastic particle material, which has remained in the conveyor pipe area after the orifice of the front part has been closed, may lead to agglomerations of conveyed material around the piston rod, which then collects on the rear of the piston rod on retraction of the piston and is either drawn into the guide section of the base part or else hinders or prevents retraction of the piston into the piston guide of the base part. Such contamination makes necessary frequent servicing and cleaning in particular of the guide section of the base part. Originally it was not possible to detect such contamination, since the plastic particle material is usually able to pass through a boundary gap remaining between the piston and the wall of the conveyor pipe.

According to the invention, the piston rod is made to the same thickness and in the same diameter as the piston or closing piston itself, so that material adhering to the front side of the closing piston and piston rod guide is wiped off and cannot be drawn into the guide.

A pipe connects an injector head and an injector orifice. Leading into the area of the injector head is a connection nozzle for the feeding of pre-expanded plastic particles. In this pipe an injector passage extends from the orifice of the connection nozzle on the pipe to the injector orifice.

Preferably it is provided that, before a mold cavity is freshly filled, the closing piston is completely withdrawn from the injector passage in such a way that the injector passage is free. This state is described as the conveying state.

Preferably the closing piston is fully drawn into a piston rod guide and a through bore of a front part in such a way that, on retraction of the closing piston, material adhering to a casing wall of the closing piston is wiped off on the front part, and is not drawn into the piston rod guide. This is possible since the casing wall of the piston rod is designed with the identical diameter and shape as the piston rod guide and the diameter of the through bore respectively.

In this position, which is described as the rest position, the closing piston is completely withdrawn from the pipe in such a way that the latter is free.

Due to the fact that the piston rod is made with the same thickness and the same diameter as the piston and the closing piston respectively, there is no circumferential edge and no circumferential indentation at the transition from the piston rod to the closing piston at which material can adhere. Such a closing piston would, on retraction, strike a front part of a drive element. This would result in material being pressed in between the closing piston and the front part, leading it to stick permanently and in time impair the functioning of the filling injector.

In addition, according to the invention, the base part is locked to the front part by means of dowel or locking pins, so that the connection may be broken relatively quickly, if for example a different base part is to be fitted to a front part or vice-versa.

In addition, according to the invention, the end section of the front part furthest away from the orifice, by which the front part is attached to the base part, including the filler neck, which protrudes at an angle to the side, is made in one piece, which makes manufacture considerably easier. This also distinctly improves the sealing effect, and results in a low-maintenance and stable component.

In addition the compaction provides that the injector may be locked in an ejector position of the closing piston. The closing position of the closing piston is then reached when the closing piston closes the orifice and the mold is closed to produce the molded part. So that the molded part may subsequently be ejected from the mold, the entire mold with the injector travels against the direction of conveyance, resulting in the pneumatic conveyor unit travelling with a stop plate against a firm counter bearing. In the area of the conveyor unit and of the base part, the pneumatic conveyor unit is then guided against the force of springs towards the guide device of the base part in such a way that the guide unit shortens, thereby pressing the closing piston forward out of the orifice. After complete shortening, the closing piston protrudes beyond the orifice and the guide device may be locked by means of dowel pins. In this connection it is an advantage that maintenance of the closing piston is made easier and in particular the seal rings normally used on such closing pistons and which are wearing parts, may be replaced.

According to the invention, these O-rings or seal rings are made of colourless, white or non-staining or non-chalking material in such a way that discolouration of the plastic particle material does not occur.

The method according to the invention for the production of a particle form part also includes in particular the following steps:
 feeding of form particles from a material container through a pipe to a mold, and
 thermoplastic welding of the form particles in the mold to form a particle form part under the supply of heat.

According to the method, steam may be added to the form particles to be fed.

Through the addition of steam to the form particles, the later are wetted with steam, which improves their anti-friction properties. The wetting of the surface of the form particles leads to a reduction in adhesive forces, so that the risk of clogging of the form particles is minimal.

The addition of steam also effects a heating of the form particles, so that the later are already pre-heated when they enter the mold. This makes the thermoplastic welding of the form particles quicker and more reliable.

The form particles are fed from the material container along a conveyance path to the mold, with steam being added preferably at several points along the conveyance path. The amount of heat supplied with the steam should be such that the form particles are not fully activated before reaching the mold and already welded together on the conveyance path. The amount of steam must therefore be metered precisely. The amount of steam to be fed depends on various parameters, e.g. the volumetric flow of the form particles to be fed, the cross-sectional area and the geometry of the pipes, the material of the form particles, etc. The setting of the amount of steam supplied is effected by setting the pressure with which the steam is fed to a nozzle by which it is fed into the pipe of the conveyance path. Here the cross-sectional area of the orifice of the nozzle is also to be taken into account. In principle it is also possible to adjust the steam by changing the size of the nozzle.

There are polyurethane-based material compositions which already become tacky at 50° C. Form particles made from such eTPU should therefore not be heated above 50° C. in the area of the conveyance path. Higher temperatures are possible with other polyurethane-based material compositions.

Since on the one hand the form particles should not be heated above a certain temperature in the conveyance path, and on the other hand steam should be present throughout the whole conveyance path, it is advantageous to supply steam at several points along the conveyance path. By this means it is also possible to replace steam which has already condensed, so that a roughly even supply of steam along the conveyance path is obtained.

Preferably the amount of steam is set so that a thin film of condensed water forms on the surface of all form particles, thereby lowering the adhesive effect of the steam particles. The more steam is added, the more strongly the surfaces of the form particles will be wetted. Through the addition of steam, however, heat is also supplied, and the amount of heat must not be so great that the surfaces of the form particles are activated. Consequently, in determining the amount of steam, the opposing requirements of wetting and of avoiding activation must be balanced out.

Through the addition at several points along the conveyance path, the film is constantly refreshed, so that as far as possible over the entire conveyance path a reliable conveyance of the form particles is possible.

The steam is added to the form particles preferably in the material container and/or at a blowing nozzle downstream of the material container in the direction of conveyance and/or at a filling injector upstream of the mold in the direction of conveyance and/or at one or more sections of the pipe. In particular the addition is made at points or areas before curves and/or narrow points of the pipe from the material container to the mold.

The steam is preferably added at a temperature of 100 to 140° C.

When added to the form particles, the steam is preferably at a pressure corresponding to the pressure in the vessel (material container or conveyor pipe) in which the form particles are present.

The amount of steam added (at 100° C. and 1 bar) comes to around 20 to 500 times the volume of the cavity of the mold. Preferably the form particles are conditioned under higher pressure, wherein the conditioned form particles are added to the material container and held there under a certain pressure. The pressure in the material container lies preferably in the range between 2 and 5 bar. Through the conditioning of the form particles, the latter are charged with air, which acts as blowing agent. Since the conditioning takes place gradually, for example over a period of 2 to 24 hours, the compressed form particles maintain a smooth surface.

During feeding of form particles from the material container to the mold, the pressure in the pipe into the mold is set so that it is somewhat less than in the material container. On the one hand this produces a flow from the material container to the mold and on the other hand the form particles are kept small by the pressure, so that they collide with one another as little as possible and the risk of them adhering to one another and forming lumps is kept to a minimum. In the mold the pressure is preferably around 0 to 3 bar and in particular around 0.2 to 1 bar less than in the material container. With the use of blowing air, the form particles may even be conveyed against a counter pressure. Consequently the pressure in the material container may be around 0.05 to 0.15 less than in the mold.

The form particles may be separated in the material container. The separation is effected for example by feeding a flow of gas or air and/or steam which swirls the form particles around in the material container. This flow of gas is described below as the fluidisation flow. Instead of or in combination with swirling it is also possible to provide, for separating the loam particles, separating rollers, a star feeder lock, a rotating chamber, a screen plate (intermediate plate) through which the particles are pressed due to a difference in pressure or (vibratory) movement, and/or screw filling.

The form particles are preferably fed to the conveyor pipe initially separated, and conveyed in the conveyor pipe in a gas flow, in particular an air flow, which is enriched with steam, as far as possible with clearance from one another, so that the individual form particles reliably pass along the conveyance path and into the mold.

The means and effects to counteract lump formation during conveyance are set out below, and may be applied individually or in combination:

- the addition of steam to the form particles, which lowers the adhesion forces of the form particles and increases their anti-friction properties
- conveyance of the form particles under increased pressure, by means of which they may be kept small, so that the packing density in the pipe may be raised and at the same time a high flow of expanded form particles is obtained. The form particles may be conditioned before conveyance or also conveyed unconditioned but under pressure
- separation of the form particles in the material container, so that the form particles are conveyed through the pipe with the least possible contact with other form particles
- coating of the form particles with a lubricant, e.g. wax
- blowing in powder/dust as a lubricant for the form particles to be conveyed. This is preferably used in combination with a crack splitting mold, with which it is possible to blow away the powder/dust through the gap before welding
- movement, in particular vibration, of the pipe and/or the mold during filling. For this purpose, the pipe is preferably in the form of a flexible tube.

Since the conveyance of the form particles is a stochastic system, it is not possible to completely avoid individual form particles coming into contact with one another. The addition of steam to the form particles prevents form particles which come into contact with one another from adhering together permanently, forming lumps, and blocking the pipe or areas of the mold.

In principle it is also possible to use non-conditioned form particles and/or carry out filling of the mold without pressure. Then it is expedient for the mold to comprise at least two parts, movable relative to one another, so that the mold cavity, after it has been filled, may be reduced by the moving together of the two parts in order to compress the form particles inside it. A mold of this kind is also described as a crack splitting mold. A crack splitting mold may also be used in principle in combination with pressure filling, in which case, however, the compaction through the moving together of the two parts of the mold takes place over only a short distance, since a high filling density has already been obtained through the pressure filling. In the case of some plastic bodies, high compaction by a crack splitting mold is disadvantageous. This applies especially to plastic bodies of varying thickness, since thinner sections are compacted much more than the thicker sections. Such uneven compaction is normally not desired. In addition, anisotropic shrinkage behaviour occurs, with less shrinkage in the closing direction of the crack splitting.

For pressure filling, the mold is designed with a tight mold cavity, with pressure valves connected to the mold cavity, from which the blowing and filling air escapes in filling of the mold when a certain pressure is reached.

The steam fed in for conveyance of the form particles is preferably saturated steam, i.e. saturated dry steam. On cold surfaces, such as the as yet unheated form particles, the steam condenses to water. Since, on condensation to water, the steam reduces considerably in volume, the feeding of steam does not give rise to any pressure or volume problems.

The form particles are preferably made of expandable thermoplastic polyurethane (eTPU). The thermoplastic polyurethane may be a polymer blend containing a predetermined polyurethane content. Such a thermoplastic polymer blend is known from WO 2010/010010 A1. The polymer blend contains preferably a proportion by weight of at least 5% polyurethane and in particular preferably at least 50% polyurethane. The form particles may also be made from a polymer blend with a proportion by weight of at least 80% or 90% polyurethane. With regard to the make-up of the polymer blend, full reference is made to WO 2010/010010 A1.

The form particles may be provided with a blowing agent. Suitable blowing agents are for example pentane, butane or $CO_2$ or mixtures thereof. Solid blowing agents such as azocarbonamide or toluene-ρ-sulphonic acid hydracite may also be used. It is also possible to use form particles which have no blowing agent. Surprisingly it has been found that, due to the conveyance according to the invention by means of steam, lubrication of the closing piston of the injector by means of oil or grease is not necessary, and that fully satisfactory lubrication is obtained by steam condensate on the closing piston surface.

In the case of the invention it is advantageous that, due to a series of suitable measures, the injectors for the injection of particle forms into molds for further processing may be made easier to maintain and more robust in design.

The invention is explained by way of example with a drawing which shows in:

FIG. 1 an injector according to the invention in a perspective view

FIG. 2 the injector according to FIG. 1 in a partially cutaway side view

FIG. 3 the injector according to FIG. 1 viewed from above

FIG. 4 the closing piston viewed from the side

Figure 5:
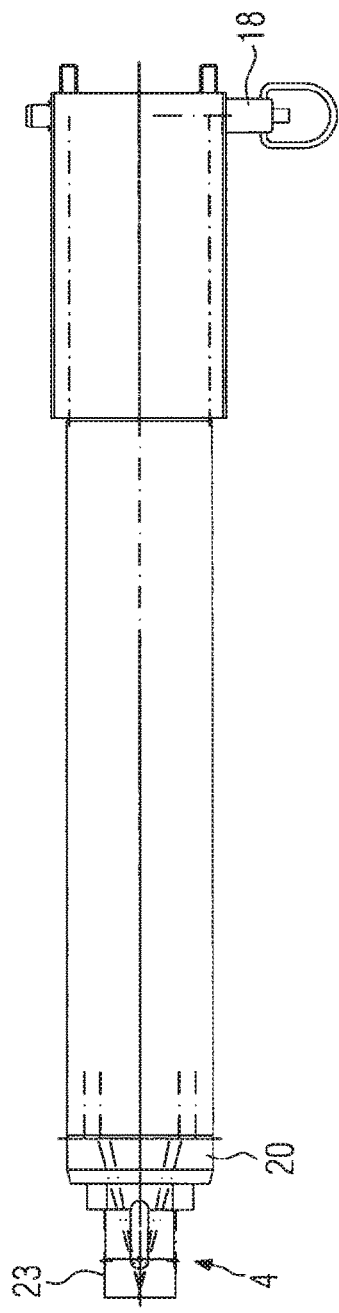

FIG. 5 the front part in a side view

Figure 6:
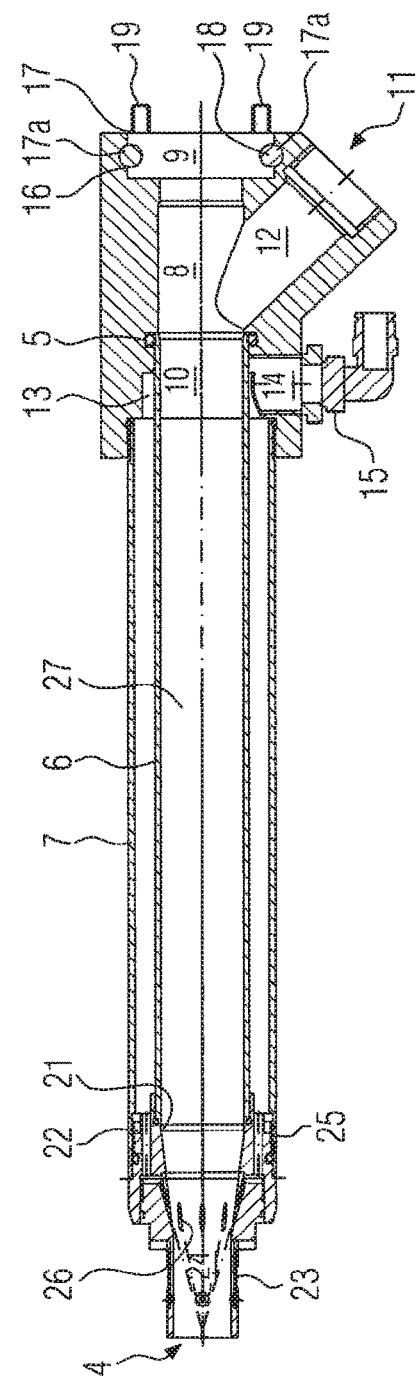

FIG. 6 the front part in a cutaway view

Figure 7:
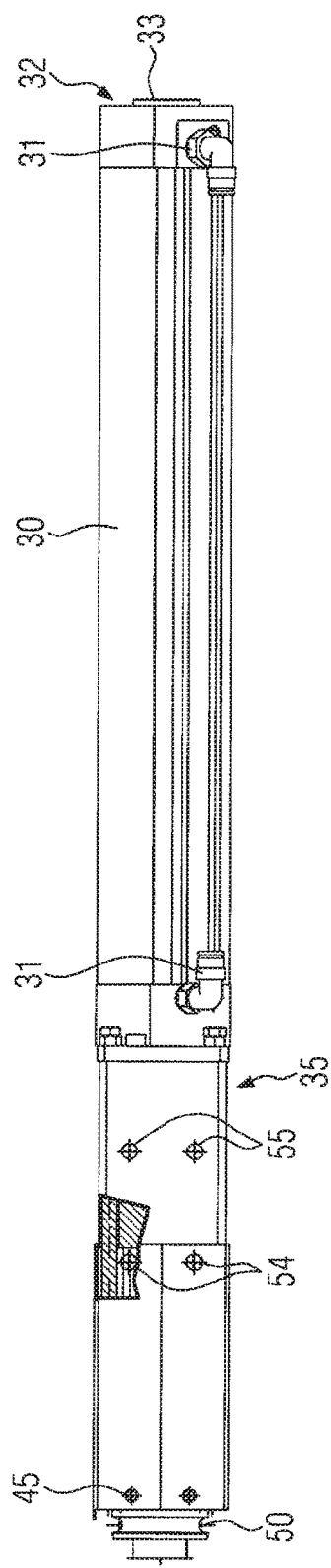

FIG. 7 the base part in a side partially cutaway view

Figure 8:
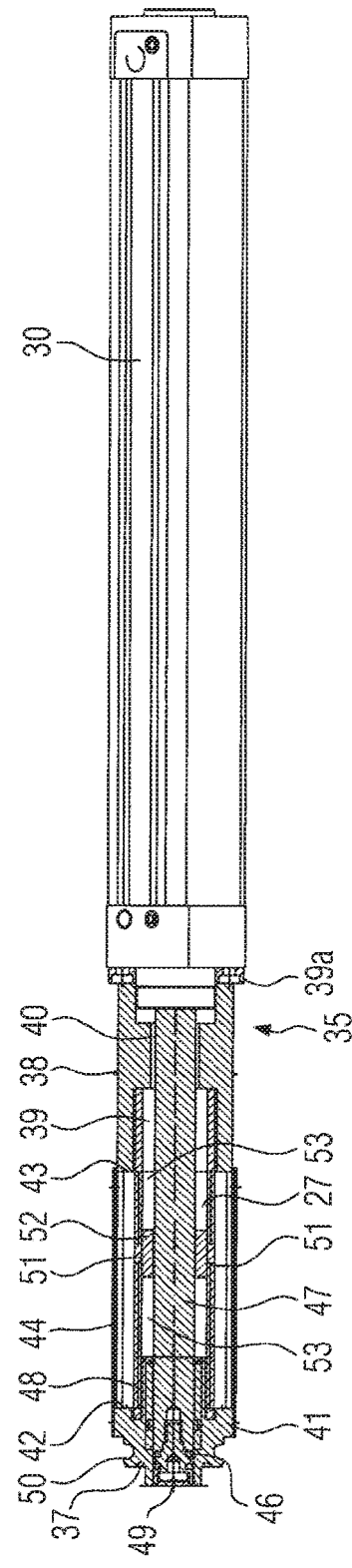
Figure 9:
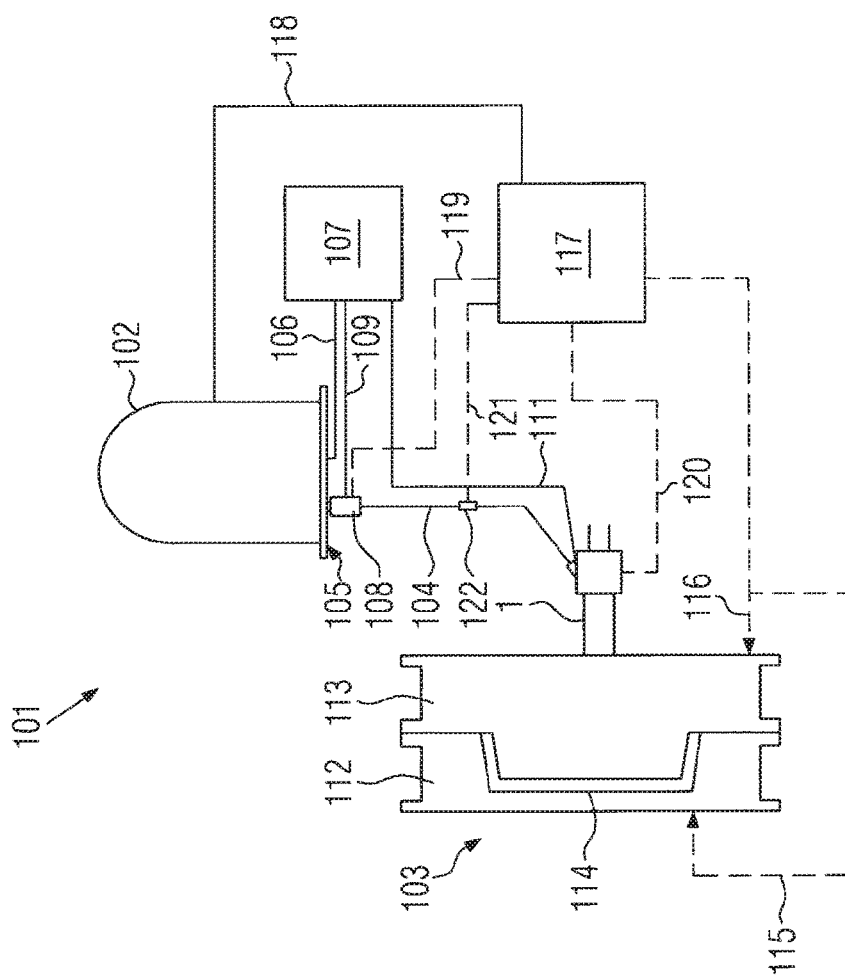

FIG. 8 the base part in a further partially cutaway view, showing the closing piston and the piston rod FIG. 9 an apparatus for the production of a particle form part in a schematic block diagram An injector 1 (FIGS. 1 to 3) according to the invention has a front part 2 and a base part 3, joined together axially in effective connection abutting one another.

The front part 2 (FIGS. 5, 6) has an injector orifice 4 and an injector head 5. The injector head 5 and the injector orifice 4 are axially spaced apart and connected by a first pipe or inner pipe 6, while a casing pipe 7 is fitted coaxially around the inner pipe 6.

The injector head 5 is a substantially rectangular component with an axial through hole 8, wherein the axial through hole 8 extends from a base-part-side connection area 9 to an orifice-side connection area 10 and enlarges in steps on the orifice side.

Attached at the side of the injector head 5 and according to the invention in one piece, a connection nozzle 11 is fitted in an essentially known manner running at an angle to the axis of conveyance, and leads with its connection nozzle bore 12 into the through hole 8. The inner pipe 6 is pushed from the area 10 into the injector head 5, and fixed in the latter in a suitable manner, so that the inner pipe 6 continues the through hole 8 in the direction towards the injector orifice 4. In addition, the casing pipe 7 is pushed into the injector head 5 on the orifice side in the area 10, coaxial to the inner pipe 6, and suitably secured in place. Provided around the inner pipe 6, with clearance from its opening into the injector head 5, is a radial enlargement or groove 13, which leads into the space between inner pipe 6 and casing pipe 7. From this groove 13, a radial bore 14 is guided to the outside, leading to a filler neck 15.

In the area of a base part side orifice 9, the through hole 8 enlarges by a step 16 to provide a locating area 17. In the locating area 17 there are at least two tangential bores or cuts in the injector head to accommodate dowel pins 18, which therefore, in the inserted state, protrude radially in the area of the locating area 17. Also provided are stud bolts 19 protruding adjacent to the locating area 17, for connecting the front part to the base part.

The injector orifice 4 is formed from an injector orifice body 20. The injector orifice body 20 is substantially cylindrical in form and has a locating area 21 to accommodate the inner pipe 6, and an outer locating area 22 with radial clearance from the latter, to accommodate the casing pipe 7. The inner pipe 6 and the casing pipe 7 are for example inserted on or into the injector orifice body 20, or screwed on or into or otherwise fastened to the orifice body 20. On the mold side, the injector orifice has an injector orifice pipe 23, which is designed for insertion for fixing in a suitable mold or a suitable bore of a mold (not shown). An axial through orifice 24 of the orifice body 20 narrows from a locating area 21 for the inner pipe to the orifice pipe 23, so that the inner pipe 6 and the orifice pipe 23 are of different diameter, with the orifice pipe 23 having a smaller diameter than the inner pipe 6. Formed by this means is a guide funnel or finding funnel, which holds and guides the piston or closing piston in a gentle manner, when the latter travels into its forward sealing position. By this means, wear is avoided, in particular also when the closing piston is not axially centred in the orifice area. The orifice body 20 thus has a nozzle-like narrowing. From the space between the inner pipe 6 and the casing pipe 7, axial bores 25 are guided forward, leading radially inwards roughly in the axial centre of the orifice head and then running at an angle forwards and inwards, so that elongated orifices 26 are provided in the narrowing area of the through opening 24.

Here the components of the front part 2 interact as follows:

Through the filler neck 15 and the opening 14, compressed air is guided through the grooves 13 into the space between the inner pipe 6 and the casing pipe 7. The air then flows through the bores 25, through the orifices 26 ahead of the orifice pipe 23 into the area of the through opening 24, by which means, in the manner of a Venturi nozzle, a vacuum is generated in the area of the inner pipe 6 and the through hole 8 of the injector head respectively. Through this vacuum, plastic particle material is sucked in through the nozzle 11 and its opening 12 into the area of the through hole 8 and the area in the inner pipe 6, and blown out into a mold through the orifice pipe 23.

The base part (FIGS. 7, 8) has an essentially known pneumatic drive element 30 which has an elongated square cross-section and two compressed air connections 31. On actuation of the compressed air connections, an actuating piston (not shown) is moved forward or backward in the drive element 30. Coupled to the actuating piston is a piston rod 47. This drive element 30 is therefore in the form of a piston-cylinder unit. Provided at the opposite end of the piston rod 47 to the actuating piston is a closing piston. At a free end 32, the pneumatic drive element 30 has an impact plate 33. At the opposite end 34, the pneumatic drive element 30 is mounted on a guide device 35. The guide device 35 has a guide housing 36 with a guide housing front part 37 and a guide housing rear part 38.

Instead of the pneumatic drive element 30 it is also possible to provide an hydraulic or electrical drive element.

The guide housing rear part 38 is rectangular with a cross-section which is, in particular, square and has a through opening 39 which runs axially and first of all narrows from a first end face 39a facing the pneumatic drive element to a piston rod guide 40 and then enlarges again to a guide housing front part 37. The guide housing front part 37 has a coupling area 41, in the same manner roughly square in cross-section and corresponding in diameter, orientation and external shape to the guide housing rear part 38. Facing end edges 42, 43 of the guide housing front part 37 and guide housing rear part 38 are spaced apart from one another and covered externally by a sleeve 44, with the sleeve 44 being fastened to the front part 37 by screws 45. The diameter of the through opening 39 in the area of the piston rod guide 40 and the diameter of a through bore 46 of the front part 37 respectively is so dimensioned that the piston rod 47 has precisely fitting sliding guidance therein. In particular, a casing wall of the piston rod 47 has the same diameter and shape as the piston rod guide 40 and the diameter of the through bore 46 of the front part 37. Fitted around the piston rod in the front part 37 is a plastic guide sleeve 48 which on the one hand guides the piston rod 47 when sliding, but also provides sealing. The closing piston 49 rests in the front part 37 with the bore 46 sealing.

A pipe 6 connects an injector head 5 and an injector orifice 4. In the area of the injector head 5 a connection nozzle 11 enters for the feeding of pre-expanded plastic particles. In this pipe 6, an injector passage 27 extends from the mouth of the connection nozzle 11 at the pipe 6 to the injector orifice 4.

Preferably it is provided that, before a mold cavity is filled, the closing piston 49 is completely retracted from the injector passage 27 in such a way that the injector passage is free. This condition is described as the conveying state.

The injector passage 27 may have a square, rectangular or polygonal cross-section. The closing piston 49 may also be square, rectangular or polygonal in cross-section. The cross-section of the closing piston corresponds to the cross-section of the piston rod 47, the cross-section of the piston rod guide 40 and of the through bore 46 of the front part 37.

In the area protruding from the sleeve 44, the front part 37 is round in shape with a half ring groove 50. The diameter in the area of the half ring groove 50 corresponds to the inside diameter of the injector head and in particular the half ring groove 50 is so dimensioned that it corresponds to the diameter of the locking pins or dowel pins in such a way that the base part 3 may be inserted axially into the front part 2 and the continuous half ring groove 50 is so arranged in the area of the continuous circular ring groove 17a that the two components are held axially together by inserting the dowel pins.

Between the front part 37 and the rear part 38, a telescopic sliding sleeve 51 is fitted coaxially with clearance around the piston rod 47, while between the sliding sleeve and the piston rod there is provided an annular spacer 52, wherein the spacer 52 has clearance from both the rear part and the front part, and compression springs 53 are provided in the respective circular ring shaped hollow spaces.

The end edges 42 of the front part 37 and the end edges 43 of the rear part 38 may be moved towards one another against the pressure if the compression springs 53, with the rear part. 38 reaching the area of the sleeve 44. The sleeve has in an area adjacent to the rear part two through bores 54 for dowel pins, while in the rear part in the area or at the level of the guide 40 similarly two bores 55 are provided which, in the inserted state, are flush with the bores 54.

Due to the axial arrangement of the front part 2 on the base part 3 it is possible, by means of the pneumatics 30, to guide the piston rod 47 and the closing piston 49 axially through the inner pipe 6, until the closing piston 49 in the area of the orifice pipe 23, with the orifice pipe 23 closed at the end, closes a mold cavity lying ahead of it. To eject a molded part, the mold is moved axially against the front part 2, so that the guide housing front part 37 is moved against the pressure of the springs 53 against the guide housing rear part 38, so that the end edges 42, 43 move towards one another inside the guide section sleeve 44. Since by this means the relevant clearance is reduced, the closing piston moves in the same manner out of the area of the orifice pipe 23 and presses against a molded part. If the bores 54 of the guide section sleeve 44 and the bores 55 in the piston rod guide 40 of the rear part 38 are flush then, by insertion of locking pins (e.g. 18), they may be prevented from moving away from one another without pressure, with the result that the closing piston 49 protrudes permanently from the orifice pipe 23 and is accessible for maintenance work.

The closing piston 49 is a substantially cylindrical component with an essentially known structure, with a plug-in connector 60 for inserting the closing piston into the front side of a piston rod. The closing piston 49 also has a substantially cylindrical guide section 61, in which a gas supply channel 62 is formed. Provided in the gas supply channel 62 are bores 63 which reach into the interior of the closing piston, where they connect with an axial bore (not shown) which extends to the front side 64 of the closing piston, where it enlarges in an essentially known manner and forms, with the front side, a so-called slit nozzle. In this connection, in a state in which the closing piston 49 is in a closing position in the injector orifice pipe 23, air may be guided from the elongated orifices 26 into the channel 62 and through the bores 63 to the front side 64 of the closing piston, in order to blow remaining material into the mold.

The closing piston 49 has at least one radial continuous seal 65, which works with the orifice pipe 23 and/or the through bore 46 to provide sealing.

A first embodiment of an apparatus 101 according to the invention for the production of a particle form part is shown in FIG. 9.

This apparatus 101 comprises a material container 102, a mold 103 and a pipe 104 leading from the material container 102 to the mold 103.

The material container 102 serves to hold the form particles. The material container 102 has a base 105 and is connected in the base area via a compressed air line 106 to a compressed air source 107. The compressed air line 106 is connected to several nozzles (not shown) provided in the base 105, so that several airflows may be initiated in the material container 102; these swirl the form particles in the container and thereby separate them.

In the area of the base 105 of the material container 102, the conveyor pipe 104 is connected to the material container 102. Adjacent to the material container 102, in the conveyor pipe 104, is a blowing nozzle 108. The blowing nozzle 108 is connected by a further compressed air line 109 to the compressed air source 107. The compressed air fed to the blowing nozzle 108 is used as blowing air, since it enters the conveyor pipe 104 through the blowing nozzle 108 and flows towards the mold 103. This generates a vacuum at the blowing nozzle 108 on the side facing the material container 102, and this vacuum sucks form particles out of the material container.

The conveyor pipe 104 leads into a filling injector 1 which is connected to the mold 103. The filling injector 1 is connected by a further compressed air line 111 to the compressed air source 107. The compressed air fed to the filling injector 1 is used on the one hand for filling the mold 103, since the flow of form particles is pressurised by the compressed air in the direction of the mold 103. On the other hand the compressed air supplied to the filling injector 1 may also be used for blowing back the form particles from the conveyor pipe 104 into the material container 102, when the filling process at the mold 103 is completed.

The mold 103 is made up of two mold halves 112, 113. Bounded between the two mold halves is a mold cavity 114, into which the filling injector 1 leads to introduce the form particles. The volume of the mold cavity 114 may be reduced by moving the two mold halves 112, 113 together, leading to compaction of form particles contained therein. With the mold halves 112, 113 moved apart, a gap is formed between the mold halves 112, 113, which is described as the crack split. Consequently such a mold 103 is also described as a crack splitting mold.

The two mold halves 112, 113 are connected via steam lines 115, 116 to a steam generator 117, in order to feed steam into the mold cavity 114 for welding of the form particles which have been fed into it.

The steam generator 117 is connected by a steam line 118 to the material container 102, in order to supply this steam. A further steam line 119 leads from the steam generator 117 to the blowing nozzle 108, so that steam may be fed to the flow of form particles.

The steam generator 117 is connected to the filling injector 1 by a steam line 120, so that steam may be fed to the flow of form particles flowing through the filling injector 1.

A steam line 121 is provided which leads from the steam generator 117 to the conveyor pipe 104, while an injector nozzle (not shown) is provided at a suitable connection point 122 in the conveyor pipe 104, to introduce steam into the conveyor pipe 104.

Provided in the steam lines and compressed air lines are pneumatically or electrically actuable valves (not shown), so that the supplied quantity of compressed air or steam may be controlled exactly by a control device (not shown).

The mode of operation of the apparatus shown in FIG. 9 is explained below:

To fill the mold, air is blown in through the compressed air line 106 in the area of the base 105 of the material container 102, in order to swirl and separate the form particles contained therein. At the same time, blowing air is fed to the blowing nozzle 108, so that form particles are sucked from the material container 102 into the conveyor pipe 104 and conveyed by the blowing air in the direction of the mold 103. Via the steam line 118, steam is fed from the steam generator 117 to the material container 102. The steam is dry saturated steam, which is fed to the material container 102 at the pressure (approx. 1 bar) obtaining in the material container 102. Preferably the steam is fed into the material container 102 adjacent to the connection point of the conveyor pipe 104, so that the form particles sucked into the conveyor pipe 104 are wetted by steam.

A further supply of steam to the flow of form particles is effected at the blowing nozzle 108, at the connection point 122 and at the filling injector 1.

The temperature of the dry saturated steam is determined by the boiling point curve of the steam and thus by the prevailing pressure. With a pressure of around 1 bar in the conveyor pipe 104, the temperature of the saturated steam is around 100° C.

The amount of steam must be so measured that the form particles are not activated on their surfaces and that they do not weld together in the conveyor pipe 104. In the case of polyurethane-based form particles, their welding temperature is around 80° to 130° C., depending on the material composition used in each case. The amount of steam must be so measured that the form particles do not reach a temperature of 90° C. or more along the conveyance path from the material container 102 to the mold 103.

If the steam comes into contact with the form particles, then the steam condenses on the surface of the form particles, since the latter are colder, and forms a thin film. This liquid film reduces the adhesive forces between the form particles and increases their anti-friction properties. In this way, the risk of form particles sticking together or forming lumps is considerably reduced and their reliable conveyance through the conveyor pipe 104 is ensured.

Through the feeding of steam at several points along the conveyance path it is possible, on the one hand, to keep the local supply of heat at the respective steam feed-in point sufficiently low to avoid activation of the form particles, and on the other hand to ensure that the form particles are adequately wetted with moisture along the entire conveyance path. In this way the form particles may be fed reliably to the mold cavity 114 of the mold 103.

After filling of the mold cavity 114 with form particles, the filling injector 1 is closed. The compressed air fed to the filling injector 1 is used to blow the form particles in the conveyor pipe 104 back into the material container 102. Preferably, during the blowing back, a fluidisation flow is fed to the material container 102. This leads to a considerable reduction in blockages in the conveyance path.

By moving together the two mold halves 112, 13, the volume of the mold cavity 114 is reduced, and the form particles it contains are compacted.

Next, steam is fed to the mold cavity 114 via the line 115, 116, in order to weld together the form particles inside. The supply of steam may also take place during the moving together and compacting of the form particles. The feeding of steam takes place preferably firstly with the mold cavity open (crack split or open valve), so that the air in the intermeshing zones is displaced and completely replaced by steam. In the case of crack steaming, preferably a sealed crack splitting mold, moving-together telescopically, is used. Steam conducts heat much better than air, leading to a more rapid and more even welding of the form particles.

A further advantageous steaming variant has turned out to be steaming with vacuum (<0.5 bar) in the mold. For this purpose, before the first steaming stage, the vacuum is built up in the mold, and then a cross-steaming step is performed. The reduced air volume between the particles ensures good heat transfer. Due to the additional pressure gradient of around 0.5 bar, even eTPU, which is already mechanically compressed (e.g. by crack-split filling or counter-pressure filling), may be subjected to a throughflow of steam and welded. Moreover, the steam temperature remains adequately low, so that the outer skin of the molded part is not welded prematurely gas-tight, before the inner zones are welded.

In the case of high compaction of the form particles in the mold, it may also be expedient during steaming to apply a vacuum to at least one side of the mold. Preferably the vacuum is applied at the side opposite the side at which the steam is fed to the mold.

After welding of the form particles to form a particle form part, the feeding of steam is discontinued, the mold is cooled down and opened to remove the particle loam part.

The process then begins afresh with the filling of the mold cavity 114 with form particles.

Preferably it is provided that, before the mold cavity 114 is refilled, the closing piston 49 is fully retracted into the piston rod guide 40 and the through bore 46 of the front part 37 respectively, so that the pipe 6 is free. On retraction of the piston rod 47, material adhering to the casing wall of the closing piston 49 is wiped off on the front part 37 and not drawn into the piston rod guide 40.

This is possible since the casing wall of the piston rod 47 is designed with the same diameter and shape as the piston rod guide 40 and the diameter of the through bore 46 of the front part 37.

This position is described as the rest position.

The embodiment explained above has four points at which steam is added to the form particles. These are the material container 102, the blowing nozzle 102*i* connection point 122, and the filling injector 1. Within the framework of the invention it is of course also possible to vary the number and location of points at which steam is added to the form particles along the conveyance path. This depends above all on the individual conveyance parameters (diameter of the conveyor pipe 104, chemical composition of the form particles, rate of conveyance, pressure of the blowing gas, number of curves or narrow points in the 104, etc.). Thus, it may be expedient to supply steam at only one single point, in particular the material container 102 or the blowing nozzle 108. On the other hand, it may also be expedient to provide several connection points in the conveyor pipe 104, at each of which a steam line is connected.

LIST OF REFERENCE NUMBERS

1 injector
2 front part
3 base part
4 injector orifice
5 injector head
6 inner pipe
7 casing pipe
8 axial through hole
9 base-part-side connection area
10 orifice-side connection area
11 connection nozzle
12 connection nozzle bore
13 radial enlargement
14 radial bore
15 filler neck
16 step
17 locating area
17*a* circular ring groove
18 dowel pins
19 stud bolt
20 injector orifice body
21 locating area
22 outer locating area
23 injector orifice pipe
24 through opening
25 bores
26 orifices
27 injector passage
28
29
30 pneumatic drive element
31 compressed air connections
32 free end
33 impact plate
34 end
35 guide device
36 guide housing
37 guide housing front part
38 guide housing rear part
39 through opening
39*a* end face
40 piston rod guide
41 coupling area
42 end edge
43 end edge
44 sleeve
45 screws
46 through bore
47 piston rod
48 plastic guide sleeve
49 closing piston
50 half ring groove
51 sliding sleeve
52 spacer
53 compression springs
54 through bores
55 through bores
56
57
58
59
60 plug-in connector
61 guide section
62 gas supply channel
63 bores
64 front side
101 apparatus
102 material container
103 mold
104 conveyor pipe
105 base
106 compressed air line
107 compressed air line
108 blowing nozzle
109 compressed air line
111 compressed air line
112 mold half
113 mold half
114 mold cavity
115 steam line
116 steam line
117 steam generator
118 steam line
119 steam line
120 steam line
121 steam line
122 connection point

The invention claimed is:

1. An injector for filling a mold with plastic particles comprising:
a front part, the front part comprising a mold-side orifice, a feed pipe for compressed air, a feed pipe for plastic particles, and a first half ring groove,
a base part connected with the front part axially in a direction of conveyance, the base part comprising a piston-cylinder unit, a piston rod guide, a guide housing front part, and a second half ring groove, wherein the piston-cylinder unit comprises a piston and a cylinder and the guide housing front part has a through bore disposed axially in the direction of conveyance, a closing piston which is axially moveable through the front part to close the mold-side orifice, the closing piston connected to a front end of the piston, and connector pins, wherein the closing piston can be retracted completely into the piston rod guide and the through bore of the guide housing front part, wherein the piston rod and the closing piston have substantially identical diameters, wherein material adhering to a front side of the closing piston can be stripped and cannot be drawn into the piston rod guide, and wherein the connector pins pass through the first and second half-ring grooves to connect the front part and the base part via a plug-in connection.

2. The injector according to claim 1, wherein the closing piston has at least one circumferentially continuous seal, wherein the seal is colorless, non-chalky or non-staining.

3. The injector according to claim 1, wherein an injector passage is formed in the front part in an area between the feed pipe for plastic particles and the mold-side orifice, and the piston may be so actuated, in a conveyance mode, that it may be completely withdrawn from the injector passage so that the injector passage is free.

4. The injector according to claim 3, wherein the base part further comprises a pneumatic, hydraulic or electrical drive element for moving the piston, and wherein the through bore of the guide housing front part is sealed in the conveyance mode when the piston is completely withdrawn from the injector passage.

5. The injector according to claim 4, wherein the closing piston has at least one circumferentially continuous seal, wherein the seal is colorless, non-chalky or non-staining.

6. An injector for filling a mold with plastic particles comprising:

a front part, the front part comprising a mold-side orifice, a feed pipe for compressed air, a feed pipe for plastic particles, an injector head, and a first half ring groove, wherein the injector head has a connection nozzle for connecting to a source of plastic particles, a base part connected with the front part axially in a direction of conveyance, the base part comprising a piston-cylinder unit, a piston rod guide, a guide housing front part, and a second half ring groove, wherein the piston-cylinder unit comprises a piston and a cylinder and the guide housing front part has a through bore disposed axially in the direction of conveyance, a closing piston which is axially moveable through the front part to close the mold-side orifice, the closing piston connected to a front end of the piston, and connector pins, wherein the closing piston can be retracted completely into the piston rod guide and the through bore of the guide housing front part, wherein the piston rod and the closing piston have substantially identical diameters, wherein material adhering to a front side of the closing piston can be stripped and cannot be drawn into the piston rod guide, and wherein the connection nozzle is located at a side of the injector head and wherein the injector head and the connection nozzle are formed in one piece.

* * * * *

UNITED STATES PATENT AND TRADEMARK OFFICE
CERTIFICATE OF CORRECTION

PATENT NO. : 10,543,623 B2
APPLICATION NO. : 15/103891
DATED : January 28, 2020
INVENTOR(S) : Norbert Reuber It is certified that error appears in the above-identified patent and that said Letters Patent is hereby corrected as shown below:

On the Title Page

Item (57), Abstract, delete:
"The invention relates to an injector for filling a mold with plastic particles, with a front part (2) and a base part (3), wherein the front part (2) has a mold-side orifice (23) and a feed for compressed air (15) and a feed for plastic particles (11), and the base part (3) is attached axially in the direction of conveyance behind the front part (2) and has a piston-cylinder unit (30, 37, 38), wherein a closing piston (49) for closing the mold-side orifice (23) is axially movable through the front part (2), together with an apparatus and a method for the production of a particle form part. The injector is characterised in that the closing piston (49) and the piston rod (47) bearing the closing piston on its front side have equal diameters or substantially equal diameters and the method comprises the following steps: feeding form particles from a material container to a mold by means of a pipe thermoplastic welding of the form particles in the mold into a particle form part under a supply of heat, wherein steam is added to the form particles to be fed."

And insert:
--The invention relates to an injector for filling a mold with plastic particles, with a front part (2) and a base part (3), wherein the front part (2) has a mold-side orifice (23) and a feed for compressed air (15) and a feed for plastic particles (11), and the base part (3) is attached axially in the direction of conveyance behind the front part (2) and has a piston-cylinder unit (30, 37, 38), wherein a closing piston (49) for closing the mold-side orifice (23) is axially movable through the front part (2), together with an apparatus and a method for the production of a particle foam part. The injector is characterised in that the closing piston (49) and the piston rod (47) bearing the closing piston on its front side have equal diameters or substantially equal diameters and the method comprises the following steps: feeding foam particles from a material container to a mold by means of a pipe
thermoplastic welding of the foam particles in the mold into a particle foam part under a supply of heat, wherein steam is added to the foam particles to be fed.--

Signed and Sealed this
Thirty-first Day of March, 2020

Andrei Iancu
*Director of the United States Patent and Trademark Office*